US012667038B2

(12) United States Patent
Zink

(10) Patent No.: US 12,667,038 B2
(45) Date of Patent: Jun. 30, 2026

(54) TECHNIQUE FOR DETERMINING A TERRAIN CONTOUR AND FOR HEIGHT CONTROL FOR AN AGRICULTURAL DISTRIBUTION MACHINE WITH A DISTRIBUTION BOOM

(71) Applicant: HORSCH LEEB Application Systems GmbH, Landau an der Isar (DE)

(72) Inventor: Florian Zink, Landau an der Isar (DE)

(73) Assignee: HORSCH LEEB APPLICATION SYSTEMS GMBH, Landau an der Isar (DE)

( * ) Notice: Subject to any disclaimer, the term of this patent is extended or adjusted under 35 U.S.C. 154(b) by 60 days.

(21) Appl. No.: 18/778,682

(22) Filed: Jul. 19, 2024

(65) Prior Publication Data

US 2025/0024768 A1     Jan. 23, 2025

(30) Foreign Application Priority Data

Jul. 20, 2023     (DE) ..................... 10 2023 119 205.1

(51) Int. Cl.
*A01M 7/00*          (2006.01)
*A01B 63/02*         (2006.01)
(Continued)

(52) U.S. Cl.
CPC ............ *A01B 63/02* (2013.01); *A01B 69/008* (2013.01); *A01C 23/04* (2013.01); *A01M 7/0089* (2013.01);
(Continued)

(58) Field of Classification Search
CPC ........... A01M 7/00; A01B 63/111; G05D 3/00
See application file for complete search history.

(56) References Cited

U.S. PATENT DOCUMENTS 9,148,995 B2 * 10/2015 Hrnicek ............... A01C 23/008
9,226,490 B2 * 1/2016 Keye ................... A01M 7/0057
(Continued)

FOREIGN PATENT DOCUMENTS

CN          107787630 A      3/2018
DE    10 2019 129 206 A1    4/2021
(Continued)

OTHER PUBLICATIONS

Extended European Search Report dated Dec. 16, 2024 from corresponding European Patent Application No. 24187072.4, 7 pages.
(Continued)

*Primary Examiner* — Tan Q Nguyen
(74) *Attorney, Agent, or Firm* — Ruggiero McAllister & McMahon LLC

(57) ABSTRACT

A method for determining a terrain contour lying ahead in the direction of travel of an agricultural distribution machine includes determining a reference distance of a distribution boom from a reference measuring point of a target area, for example, a ground or crop surface, and determining a distance of the distribution boom from a measuring point of the target area arranged ahead of the reference measuring point in the direction of travel of the distribution machine. The method further includes referencing, preferably by comparing and/or relating the determined distance to the determined reference distance, to determine a change in the terrain contour at the measuring point relative to the reference measuring point. An agricultural distribution machine has a distribution boom and a control device for controlling the height of a distribution boom of such a distribution machine.

29 Claims, 7 Drawing Sheets

(51) Int. Cl.

| | | |
|---|---|---|
| *A01B 69/04* | (2006.01) | |
| *A01C 23/04* | (2006.01) | |
| *B05B 12/12* | (2006.01) | |
| *G01S 13/86* | (2006.01) | |
| *G01S 13/89* | (2006.01) | |
| *G05D 3/12* | (2006.01) | |
| *G05D 3/00* | (2006.01) | |

(52) U.S. Cl.
CPC .......... *B05B 12/124* (2013.01); *G01S 13/862* (2013.01); *G01S 13/89* (2013.01); *G05D 3/12* (2013.01)

(56) References Cited

U.S. PATENT DOCUMENTS

| | | | | |
|---|---|---|---|---|
| 2011/0153169 A1* | 6/2011 | Peterson | ............. | A01M 7/0075 |
| | | | | 701/50 |
| 2018/0027727 A1* | 2/2018 | Leeb | .................... | A01C 23/047 |

FOREIGN PATENT DOCUMENTS

| | | | |
|---|---|---|---|
| DE | 10 2019 129 206 B4 | 12/2024 | |
| EP | 3 569 049 B1 | 10/2022 | |
| EP | 4260700 A1 * | 10/2023 | .......... A01M 7/0057 |

OTHER PUBLICATIONS

German Search Report dated Feb. 22, 2024 from corresponding German Patent Application No. 10 2023 119 205.1, 7 pages.

* cited by examiner

TECHNIQUE FOR DETERMINING A TERRAIN CONTOUR AND FOR HEIGHT CONTROL FOR AN AGRICULTURAL DISTRIBUTION MACHINE WITH A DISTRIBUTION BOOM

CROSS-REFERENCE TO RELATED APPLICATIONS

This application claims priority under 35 U.S.C. § 119 to German patent application DE 10 2023 119 205.1, filed Jul. 20, 2023, the entire disclosure of which is incorporated herein by reference.

BACKGROUND OF THE DISCLOSURE

1. Field of the Disclosure

The disclosure relates to methods for determining a terrain contour lying ahead in the direction of travel of an agricultural distribution machine and a method for controlling the height of such a distribution machine. The disclosure also relates to an agricultural distribution machine and to a control device for controlling the height of a distribution boom of such a distribution machine.

2. Description of Related Art

It is known from the prior art to use such agricultural distribution machines (hereinafter also referred to as distribution machines for short) for the uniform distribution of liquid and/or solid agricultural active agents on an agricultural area to be processed. In order to achieve the greatest possible impact force, such distribution machines have a distribution boom extending over a large width transverse to the direction of travel of the distribution machine. Distribution elements such as spray nozzles, impact elements or the like are attached to the distribution boom to distribute the respective active agents.

When spreading, the distance between the distribution boom and the field soil or the crop should remain as constant as possible across the entire working width. To control the position of the distribution boom, in particular to adjust the height in relation to a crop, it is known from the prior art to mount the distribution boom on the carrier vehicle in a height-adjustable manner by means of an adjusting device.

To detect the height position as part of the height control of the distribution boom, it is also known from the prior art to provide ultrasonic sensors on the distribution boom which are oriented in the direction of the crop, i.e. directed substantially vertically downwards, with which an actual distance of the distribution boom relative to the crop or relative to the arable land can be detected.

However, known systems for height control of the distribution boom that use such ultrasonic sensors have the disadvantage that the position control of the distribution boom can often react too late to changing height distances between the distribution boom and the crop. The reason for this is the comparatively long system reaction time, i.e. the time that elapses between the detection of the height position and an actual adjustment, i.e. a change in the position of the distribution boom. This reaction time is influenced, for example, by the comparatively high mass inertia of the boom, the reaction time of the adjusting device, e.g. a hydraulic system, and the processing time for the sensor data.

Assuming a reaction time of 1.2 s as an example, based on a driving speed of, e.g., 18 km/h=5 m/s, this would result in a driving distance of six metres until the control to reach the desired height position begins or until this height position is reached. The adjustment is therefore too late. Furthermore, the height can already change again within these six metres, so that it is not possible to adjust the position of the distribution boom to changing height distances with sufficient accuracy. In practice, approaches are also known for using a sensor device to determine a terrain contour, up ahead, of the target area and to use it for height control of the distribution boom. However, the techniques known to date for this do not determine the terrain contour ahead with sufficient accuracy with regard to applications for controlling the position of the distribution boom.

SUMMARY OF THE DISCLOSURE

It is therefore an object of the disclosure to provide an improved technique for adjusting the position of a distribution boom to changing height distances relative to a terrain, with which disadvantages of conventional techniques can be avoided.

These objects are achieved by devices and methods having the features and advantageous developments that are described herein.

A first aspect of the present disclosure relates to a method for determining a terrain contour lying ahead in the direction of travel of an agricultural distribution machine. The agricultural distribution machine comprises a distribution boom for spreading material and can be, for example, a field sprayer or a pneumatic fertilizer spreader. The terrain contour can be understood as a height profile of a target area to be processed by the distribution machine. The target area can be a ground or crop surface, for example.

The method comprises determining a distance of the distribution boom from a reference measuring point of a target area. This distance is hereinafter referred to as the reference distance. The method also comprises determining a distance of the distribution boom from at least one (further) measuring point of the target area arranged ahead of the reference measuring point in the direction of travel of the distribution machine. The reference distance of the distribution boom from the reference measuring point and the (further) distance of the distribution boom from the measuring point ahead are preferably determined simultaneously. The reference distance of the distribution boom from the reference measuring point and the (further) distance of the distribution boom can also preferably each be determined starting from a fixed position of the distribution boom or the distribution machine.

The method further comprises referencing the determined distance with the determined reference distance to determine a change in the terrain contour at the measuring point relative to the reference measuring point, preferably to determine a change in the vertical distance of the distribution boom to the target area at the reference measuring point compared to the measuring point.

The referencing of the determined distance with the determined reference distance can comprise a comparison and/or setting in relation of the determined distance with the determined reference distance (or can be carried out by such a comparison and/or setting in relation).

Advantageously, the method makes it possible to determine a change in the terrain contour in advance, so that it is possible to react to this at an early stage (in good time) as part of a height control of the distribution boom. Referencing, e.g. comparing and/or relating the determined distance to the reference distance, makes it possible to record measured distance values that can be used to determine a relative change in the terrain contour with sufficient accuracy. Referencing allows two measured values to be viewed relative to each other, which means that terrain changes can be detected more accurately. The method is particularly advantageous for determining a terrain contour ahead using a sensor device arranged on the distribution boom.

Preferably, the aforementioned steps (determining the reference distance, determining the distance and referencing the determined distances to each other) are carried out successively, e.g. continuously or at regular intervals, while the distribution machine is travelling, for example at a sampling rate in the range of from 1 to 50 Hz. Advantageously, the terrain contour ahead can be determined as accurately as possible in driving operation.

For example, referencing can involve comparing a vertical component of the distance with a vertical component of the reference distance. The comparison can include a subtraction or forming of a difference of the two vertical components. The difference between the vertical components results in the change in the vertical distance of the distribution boom to the target area at the reference measuring point compared to the measuring point.

Additionally or alternatively, referencing the determined distance with the determined reference distance can include determining a comparison distance from the determined distance and from an angle between different measurement directions of the distance and the reference distance, as well as a subsequent comparison of the comparison distance with the reference distance. The comparison distance can be the portion of the distance projected onto the measuring direction of the reference distance (or the portion of the distance vector projected onto the direction of the reference distance vector). The difference in length between the projected portion and the length of the reference distance can in turn be used to calculate a change in the vertical distance of the distribution boom to the target area at the reference measuring point compared to the measuring point.

The aforementioned angle between the measuring direction of the distance and the measuring direction of the reference distance is known and constant for each measuring point. In other words, the angle between the distance vector and the reference distance vector is known and constant. The distance vector and the reference distance vector are therefore geometrically related via the angle between them, e.g. in a trigonometric or triangular relationship. Referencing the determined distance with the determined reference distance to determine a change in the terrain contour at the measuring point relative to the reference measuring point can therefore be carried out based on this geometric relationship. In other words, the measuring point, the reference measuring point and a sensor point at which a sensor device for detecting the reference distance and the distance is arranged on the distribution machine, preferably on the distribution boom, can form corners of a geometric figure, preferably a triangle. The referencing process in this case involves comparing and/or relating the distance to the reference distance on the basis of the geometric shape, preferably the triangle. Changes in height detected on the basis of the measured values can be calculated quickly in this way.

Preferably, the determined change in the terrain contour comprises a determined gradient of the terrain contour and/or a determined course of the terrain contour lying ahead. This enables better generation of a target curve for height control. For example, the method can include assigning actually existing gradients, e.g. gradient angles, to a terrain contour ahead of the distribution boom.

For example, the reference distance can be a vertical or substantially vertical distance between the distribution boom and the target area. However, it is emphasized that the reference distance does not necessarily have to be measured as a vertical distance. The reference distance can be measured at a reference measuring point, which is located diagonally in front of the distribution boom, for example, as long as this is closer to the distribution boom than the measuring point.

Another physical variable, such as an acceleration or a trajectory, can also be used as a reference variable with which the determined distance is compared or set in relation to.

In a further embodiment, determining the distance and the reference distance comprises receiving sensor data from a sensor device for detecting a terrain contour ahead. In this case, the sensor device is arranged on the distribution machine, preferably on the distribution boom. The sensor device preferably comprises a radar sensor. The advantage of a radar sensor is that the target area can be scanned at several measuring points simultaneously. The radar sensor can therefore be used advantageously to determine both the distance and the reference distance at the same time. The sensor data includes current values for the distance and the reference distance, as well as optionally the angle between different measurement directions of the distance and the reference distance.

In a particularly preferred embodiment, a field of view of the sensor device for detecting the terrain contour ahead is divided into several measuring points, preferably sectors, which are spaced at different distances from the distribution boom in the direction of travel of the distribution machine. In this case, the sensor device is designed to determine a distance between the distribution boom and the target area for each of the measuring points. According to this embodiment, at least one of the several distances is used for referencing with the determined reference distance. The accuracy of the detection of the terrain contour ahead can thus be improved.

According to a further embodiment, one distance can, for example, be selected from the multiple distances depending on a current speed and used for referencing with the determined reference distance. The current speed can be, for example, a current travel speed of the distribution machine. Alternatively, the current speed can be a current movement speed of the sensor device, which can deviate from the travel speed when cornering and the sensor device is not positioned centrally on the distribution boom.

For example, the distance can be selected depending on the current speed in such a way that the higher the current speed, the further away from the reference measuring point the measuring point of the selected distance is. This offers the advantage that at high current speed, a measuring point further ahead in the direction of travel is selected which, in view of the high speed, allows more time to adjust the height of the distribution boom to the change in the terrain contour detected at the measuring point. If the current speed is lower, a closer measuring point can be selected, as a lower speed allows a longer reaction time for height control. At the same time, the closer the measuring point ahead is, the more accurately the change in the terrain contour ahead can be recognized.

Additionally or alternatively, the distance can be selected depending on the current speed in such a way that $s \geq v^*t$, where s corresponds to a distance, in the direction of travel of the measuring point, of the selected distance from the distribution boom (thus the horizontal distance when travelling in the plane), v corresponds to the current speed, e.g. the current travel speed of the distribution machine, and t corresponds to a reaction time of the distribution machine for height adjustment. This ensures that, taking into account the required reaction time of the distribution machine for height adjustment, there is sufficient time to adjust the distribution boom to a new target height which has been determined depending on the previously determined change in the terrain contour According to a further embodiment, the distance and the reference distance are detected by means of the same sensor of the sensor device, preferably by means of a radar sensor. This enables a particularly reliable comparison or correlation of the measured values to the distance and reference distance.

Alternatively, the distance can be detected by means of a first sensor, e.g. a long-range sensor, and the reference distance by means of a second sensor, e.g. a short-range sensor. The first sensor (long-range sensor) is preferably a radar sensor. The second sensor (short-range sensor) is preferably an ultrasonic sensor. This variant offers the advantage that an ultrasonic sensor, which is usually already present, can be used as a short-range sensor, while the field of view of the long-range sensor can be focused on the measuring point(s) lying ahead.

According to a further embodiment, a longitudinal inclination of the distribution machine to the travelling surface and/or to the horizontal is determined and taken into account as a correction variable when determining the reference distance and/or the distance of the distribution boom. Advantageously, longitudinal inclination effects of the distribution machine, which change the position of the measuring point lying ahead, can be taken into account in order to improve the accuracy of the change in the terrain contour.

For example, the longitudinal inclination of the distribution machine can be detected by means of an inclination sensor. Additionally or alternatively, the longitudinal inclination of the distribution machine can be determined by means of a vertical or substantially vertical distance measurement to the target area in front of a front axle or drawbar of the distribution machine and by means of a further vertical or substantially vertical distance measurement to the target area behind the front axle or behind the drawbar of the distribution machine.

Additionally or alternatively, the determined longitudinal inclination can be used to determine uphill or downhill travel and/or to determine longitudinal inclinations generated by uneven ground. Accordingly, different correction factors can be used, for example, when calculating an upcoming change in the terrain contour, depending on whether the longitudinal inclination was generated by uphill or downhill travel or by uneven ground.

The terrain contour determined according to the method can advantageously be used to control the height of the distribution boom. A further aspect of the present disclosure relates accordingly to a method for controlling the height of a distribution boom of the agricultural distribution machine.

The method comprises determining a terrain contour lying ahead in the direction of travel of the distribution machine according to a method for determining a terrain contour lying ahead in the direction of travel of an agricultural distribution machine as described herein. The aspects and features described herein relating to the method for determining the terrain contour ahead are therefore disclosed in conjunction with the method for height control-independently of one another and also in combination.

The method for height control also comprises determining, depending on the determined terrain contour, a target curve for the height control of the distributor boom, and actuating an adjusting device of the distributor boom for height control of the distributor boom in accordance with the determined target curve. Advantageously, a better height control of the distribution boom is provided, in which upcoming terrain contour changes are determined in advance and used for height control.

It is also possible that, to improve the height control, a tilt sensor is also assigned to the vehicle and the values of the tilt sensor are in turn compared with the detected height distances. In this way, height control in particular can be improved by analyzing whether the sprayer is actually moving uphill or downhill.

A further embodiment of the height control method is characterized in that the reference curve determined on the basis of the terrain contour lying ahead is used for a primary, preferably initial, height control of the distribution boom and (only) the reference distance is then used for a secondary height control as subsequent or fine control. In the primary, preferably initial, height control, both the determined distance and the determined reference distance are used; only the reference distance is then used in the secondary height control as subsequent or fine control. This allows height control to be further improved. On the one hand, with regard to the reaction-time-related latency of the altitude control, an early adjustment of the altitude is initiated based on the primary altitude control. This can be subject to inaccuracies due to the change in terrain contour detected in advance, but these can then be corrected by means of subsequent or fine control.

A further embodiment of the method for height control is characterized in that times for actuating the adjusting device of the distribution boom for height control of the distribution boom in accordance with the determined target curve are defined, preferably depending on a travel speed of the distribution machine, in such a way that a reaction time of the adjusting device during height control is at least partially compensated, e.g. in that the actuating signals for height control are generated before the distribution boom reaches the terrain contour change, i.e. the changing height distances. A reaction time in height control can be understood as the technically induced delay time that elapses between the sensory detection of a terrain contour change, e.g. a changing height distance, and an adjustment of the position of the distribution boom to the changed height position.

It has already been mentioned above that the reaction time is influenced, for example, by the processing time of the sensor data, the reaction time of the adjusting device, e.g. the reaction time of the hydraulics in the case of hydraulic adjusting devices, and the mass inertia of the distribution boom or the maximum adjustment speed of the adjusting device. By detecting changing height distances in advance, the control device can generate control signals to adapt to these changing height distances before the distribution boom reaches a changed height distance. The detection in advance of (upcoming) terrain contour changes enables the times for actuating the positioning device to be determined in such a way that the reaction time for adapting to a terrain contour change can be compensated for at least in part, preferably completely.

It is possible that during field work of the distribution machine (for example continuously) height and/or position adjustments of the distribution boom (e.g. to adjust to crops of different heights and/or to adjust to the contour of the terrain or the like) are carried out (in particular by means of the adjusting device), which can lead in particular to the reference distance changing (in particular accordingly).

It is possible that the reference distance comprises a reference distance that remains substantially constant (preferably at least in sections) and/or comprises a reference distance that changes (preferably at least in sections) (and thus preferably different and/or changing reference distances).

The method can preferably comprise and/or be based on a determination of a reference distance that is substantially constant (in particular, at least in sections). Alternatively or additionally, the method can preferably comprise and/or be based on a determination of a reference distance that changes (in particular at least in sections) (and thus preferably different and/or changing reference distances).

Referencing, preferably by comparing and/or setting in relation, can, for example, comprise a reference distance that is substantially constant (in particular at least in sections) and/or can be based, for example, on a reference distance that is substantially constant (in particular at least in sections).

Alternatively or additionally, referencing, preferably by comparing and/or setting in relation, can, for example, comprise a reference distance that changes (in particular at least in sections) (and thus preferably different and/or changing reference distances), and/or can be based, for example, on a reference distance (and thus preferably on different and/or changing reference distances) that changes (in particular at least in sections).

The changing reference distance, preferably the changing reference distances, can be generated, for example, by appropriately controlled height and/or position adjustments of the distribution boom (e.g. by means of the adjusting device), in particular in order to achieve a substantially constant distance of the distribution boom to the target area, for example to a ground or crop surface.

It is possible for the changing reference distance, preferably the changing reference distances, to change continuously, for example, at least in sections.

Referencing can, for example, be performed depending on this and can thus preferably include a check as to whether the reference distance changes (preferably at least in sections) and/or remains substantially constant (preferably at least in sections). Based on this, it can preferably be determined whether and, if so, how the distance and/or the terrain contour changes.

The adjusting device can preferably be set up to carry out the height and/or position adjustments of the distribution boom.

A further aspect of the present disclosure relates to a control device for controlling the height of a distribution boom of an agricultural distribution machine, which is designed to carry out the method according to the disclosure. The control device can be implemented as a control unit or can perform part of the functionality of a control unit. Preferably, the term "control device" can refer to an electronic system (e.g. embodied as a driver circuit or with microprocessor(s) and data memory) and/or a mechanical, pneumatic and/or hydraulic control system which, depending on the design, can perform copen-loop control tasks and/or closed-loop control tasks and/or processing tasks. Even if the term "open-loop control" is used herein, it can also appropriately include or mean "closed-loop control" or "control with feedback" and/or "processing".

A further aspect of the present disclosure relates to an agricultural distribution machine, preferably a field sprayer or a pneumatic fertilizer spreader. The distribution machine comprises a distribution boom for spreading material, such as fertilizer, pesticide or seed, comprising a centre part and two lateral extension arms, each having a plurality of spreading elements for spreading the material. The distribution machine further comprises a controllable adjusting device, e.g. at least one fluid-actuated adjusting cylinder, for changing a position of the distribution boom relative to an agricultural target area to be processed. The distribution machine further comprises a sensor device, e.g. a radar sensor, for detecting the reference distance and the distance to the target area and a control device for controlling the height of a distribution boom of an agricultural distribution machine, as described herein. The control device is in signalling connection with the sensor device to receive input measurement data from the sensor device. The control device is also in signalling connection with the adjusting device in order to transmit adjusting signals for height control to the latter.

In order to avoid repetition, features disclosed according to the method are also disclosed according to the device and vice versa. The above-mentioned aspects and features according to the disclosure, in particular with regard to the design of the method, thus also apply to the device, which is designed to perform corresponding method steps.

BRIEF DESCRIPTION OF THE DRAWINGS

The preferred embodiments and features of the disclosure described above can be combined with one another as desired. Further details and advantages of the disclosure are described below with reference to the accompanying drawings.

DETAILED DESCRIPTION OF THE DISCLOSURE

The embodiments shown in the figures are at least partially identical, so that similar or identical parts are provided with the same reference signs and reference is also made to the description of the other embodiments or figures in order to avoid repetition.

Figures 1A, 1B:
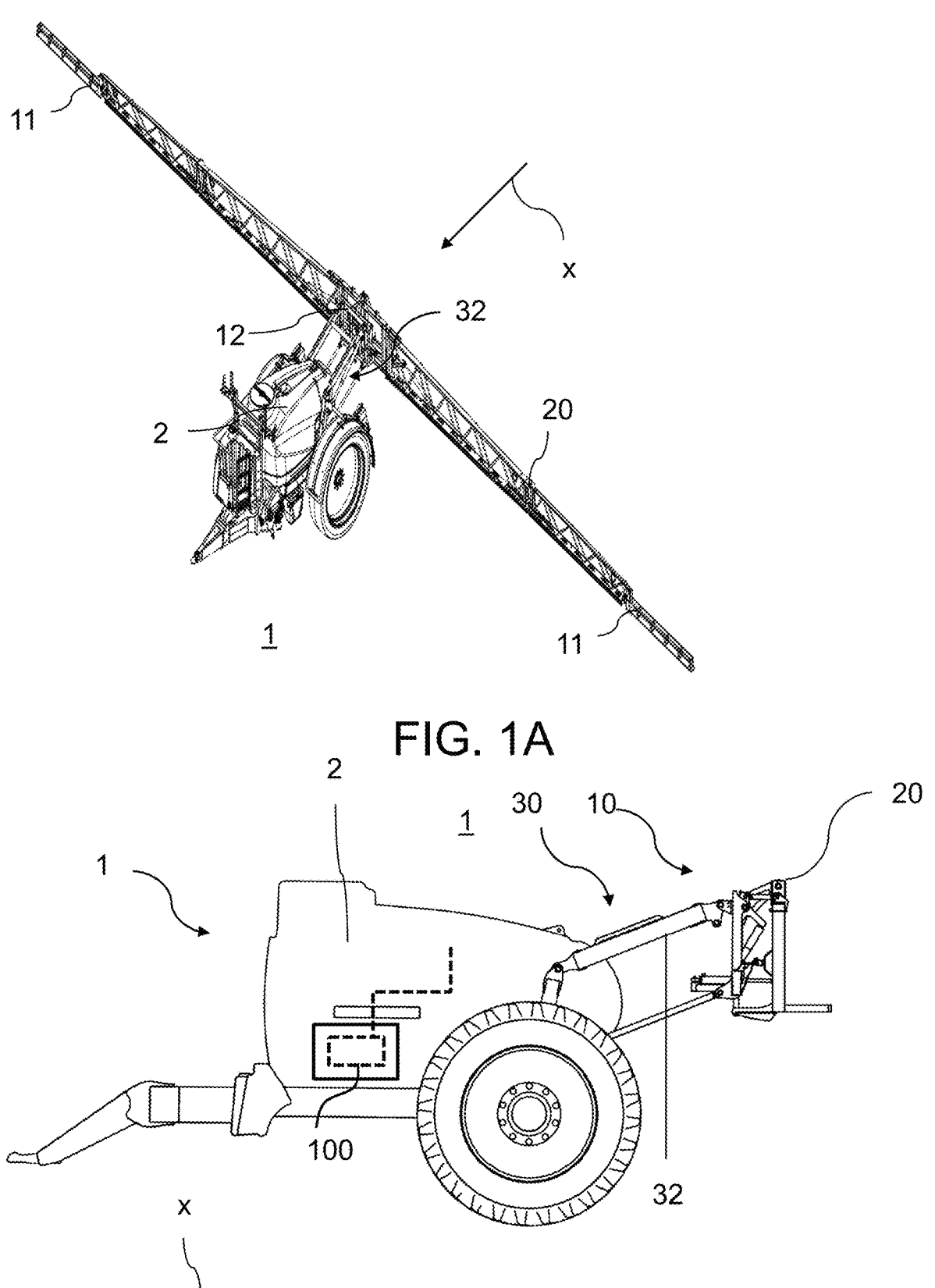
FIG. 1A shows a schematic perspective view of a distribution machine according to one embodiment.
FIG. 1B shows a schematic side view of the distribution machine from FIG. 1A.
Figure 2A:
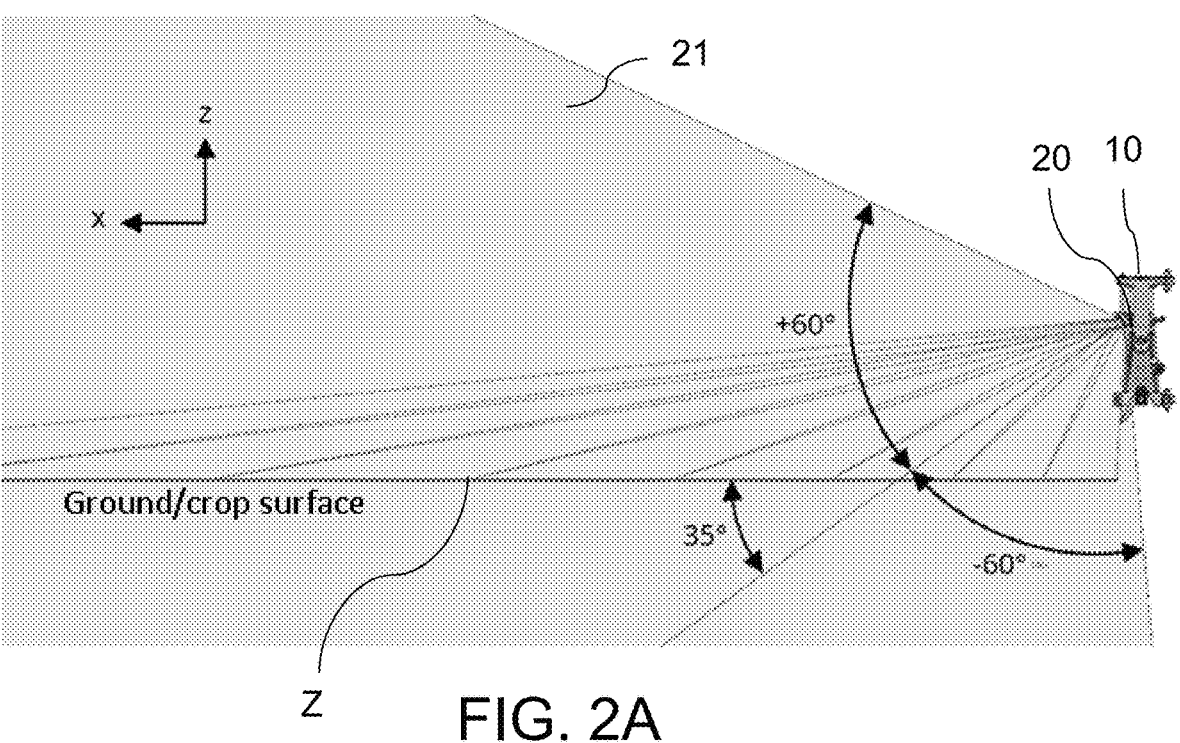
FIGS. 2A and 2B show schematic illustrations of the field of view of the sensor device according to one embodiment.
Figure 2B:
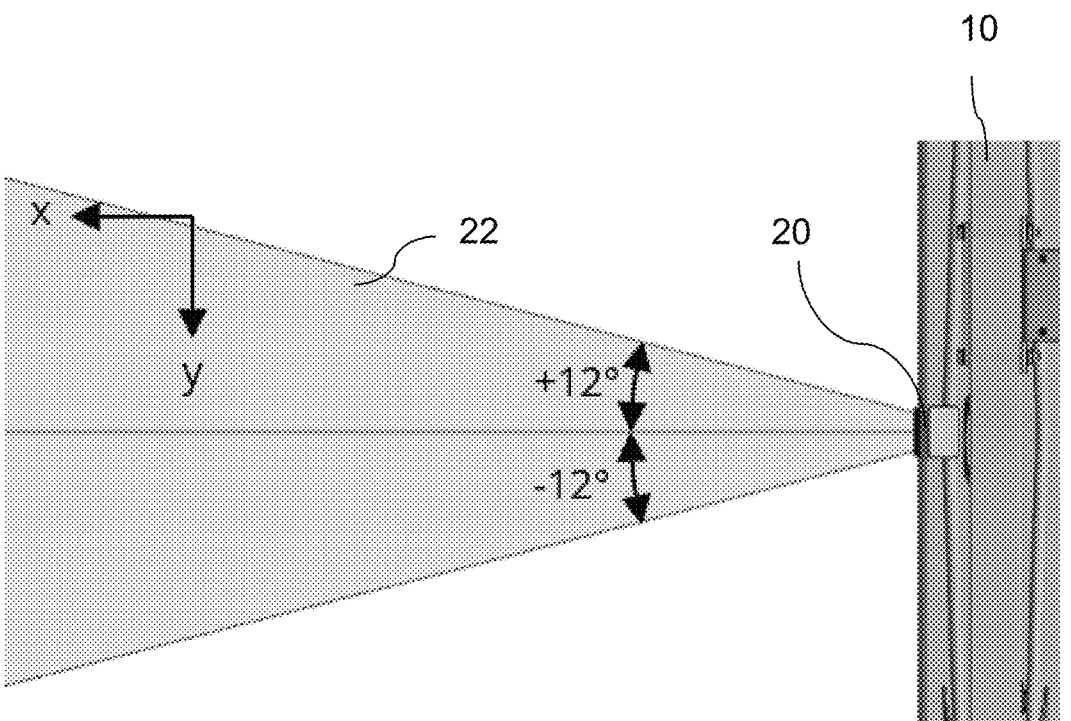

FIG. 1A shows a schematic perspective view of a distribution machine according to one embodiment. FIG. 1B shows a schematic side view of the distribution machine from FIG. 1A. The distribution machine 1 is embodied by way of example as a towed field sprayer, i.e. as an agricultural field sprayer that can be coupled or towed by means of a towing vehicle. The direction of travel is indicated by the arrow x. The distribution machine 1 has a distribution boom 10 mounted directly or indirectly on a carrier vehicle 2 for spreading material such as fertilizer, pesticide or seed. In the case of a field sprayer, the material to be spread is a spray liquid. The distribution boom 10 comprises two lateral extension arms 11, which are pivotably attached at their inner end to a centre part 12 and have an outer free end. The distribution boom 10 can, for example, have working widths of more than 20 metres. The distribution boom 10 or the extension arm 11 can be formed, at least in portions, by a truss-like boom structure or by a truss structure. In addition, the boom structure or the truss structure has a greater height than depth.

The two lateral extension arms 11 and the centre part 12 each have a plurality of spreading elements for spreading the material, which are arranged at a distance from each other, e.g. in the longitudinal direction of extent of the distribution boom. The spreading elements can each be designed as a spray nozzle (in a field sprayer) or, for example, as a baffle plate (in a pneumatic fertilizer spreader). The centre part 12 is mounted on the carrier vehicle 2 in a height-adjustable manner by means of an adjusting device 30 for height adjustment of the centre part 12 in order to set its height distance relative to an agricultural target area Z to be processed. The adjusting device 30 for adjusting the height of the centre part 12 can, for example, comprise a height-adjustable lifting frame for this purpose, on which the centre part 12 is mounted. The lifting frame can, for example, be mounted on the carrier vehicle 2 in a height-adjustable manner known per se by means of a parallelogram boom. The adjusting device 30 for adjusting the height of the centre part 12 also comprises, for example, two fluid-actuated adjusting cylinders 32, which are supported at one end on the carrier vehicle 2 and at the other end on the lifting frame. The entire distribution boom can thus be raised and lowered for height control by means of the adjusting device 30. The adjusting device can, for example, have further adjusting cylinders which are designed to swivel the extension arms 11 relative to the centre part 12 in a plane perpendicular to the direction of travel x.

The distribution machine 1 further comprises a control device 100 for controlling the height of the distribution boom 10. The control device 100 is designed to carry out methods such as those described below.

The distribution machine 1 further comprises a sensor device 20, e.g. arranged on the distribution boom 10, which is designed to detect changing height distances of the distribution boom 10 to a target area in advance. The sensor device 20 is in signal connection with the control device 100 in order to transmit sensor data to the latter.

FIGS. 2A to 3B show an example of such a sensor device 20 and illustrate its mode of operation. The sensor device 20 can be a radar sensor arranged on the distribution boom 10. The detection range (field of view) of the sensor device 20 is directed in the direction of travel x and scans a target area Z, e.g. a ground or crop surface, lying ahead in the direction of travel x. By way of example only, the vertical effective range 21 of the sensor device 20 can cover an angular range of 120° (cf. FIG. 2A) and the horizontal effective range 12 can cover an angular range of 24° (cf. FIG. 2B).

Figure 3A:
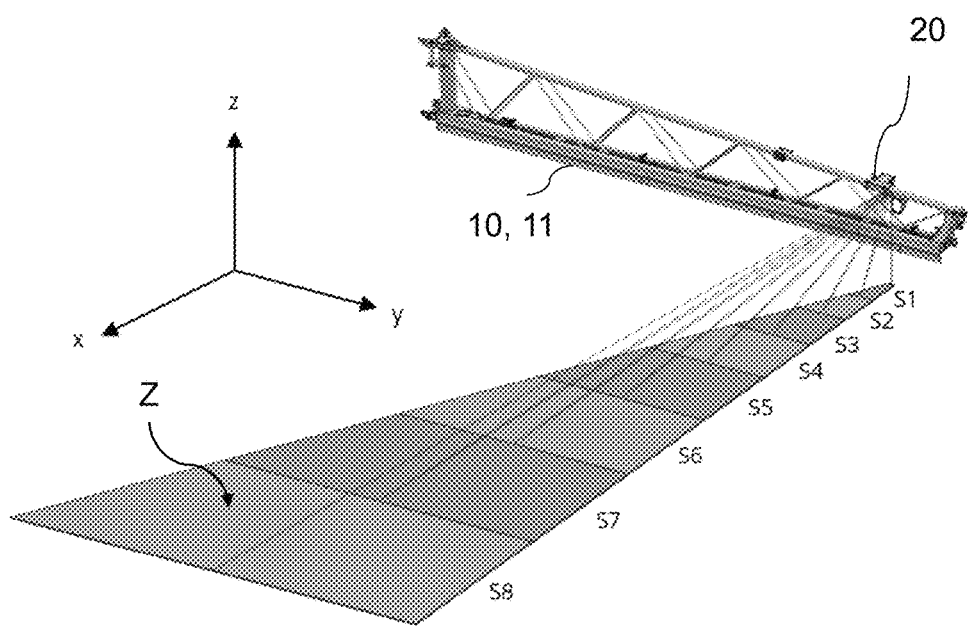
FIGS. 3A and 3B show schematic illustrations of a field of view of the sensor device divided into sectors according to one embodiment.
Figure 3B:
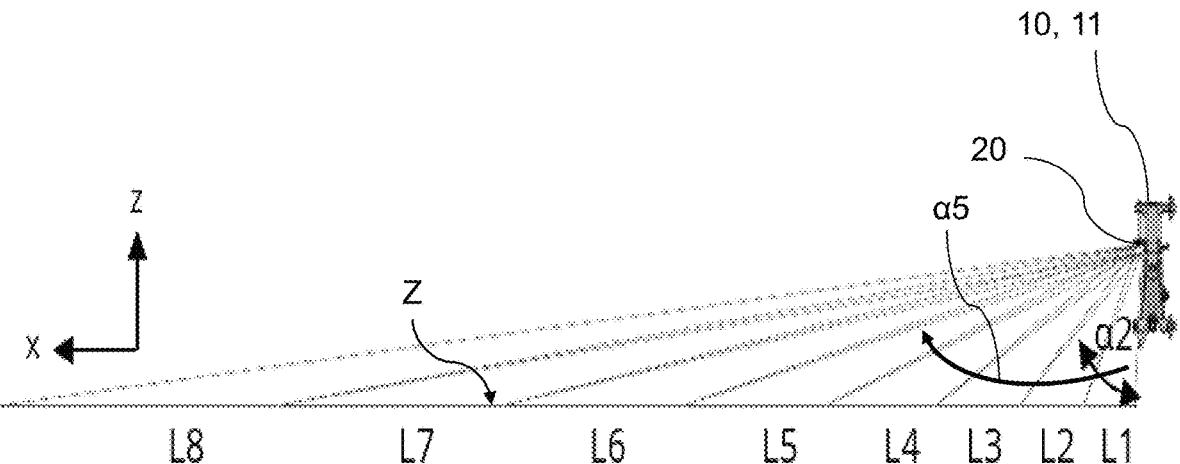

As illustrated in FIG. 3A, the field of view of the sensor device 20 can optionally be subdivided into several measuring points S1-S8, for example into several sectors S1-S8, for detecting the terrain contour ahead, which are spaced at different distances from the distribution boom 10 and the sensor device 20 in the direction of travel x of the distribution machine. As an example, the field of view is subdivided here into eight sectors S1-S8. However, there can also be more or fewer sectors. The sensor device 20 is arranged, for example, on one of the lateral extension arms 11 in such a way that the carrier vehicle does not impair the field of view of the sensor device 20 in the case of a towed distribution machine 1.

The sensor device 20 is designed to continuously scan the target area by means of radar beams and to measure a distance $L_i$, $i=1 \ldots 8$ for each sector S1 to S8 on the basis of the beams reflected back from the target area Z. The distance $L_i$ indicates the mean value of the distance of the sector $S_i$ from the sensor device 20, i.e. the length of the beams shown in FIG. 3B. Since the distance $L_i$ is also assigned a direction accordingly, it can also be referred to as a distance vector.

The sensor device 20 thus calculates a mean value for the distance $L_1$ to $L_8$ from the sensor device 20 to each measuring point S1-S8 or to each sector S1-S8, wherein the distances are preferably calculated at a predetermined sampling rate. The sampling rate can be in the range of from 1 to 50 Hz, for example. The angles $\alpha_i$; $i=1 \ldots 8$ between the vertical and the respective measuring beam (distance vector) $L_i$ are known and are the same for every measurement. The direction of the distances (measuring beams) $L_i$, which depends on the angle $\alpha_i$, is referred to as the (measuring) direction of the distance vector $L_i$.

Figure 4A:
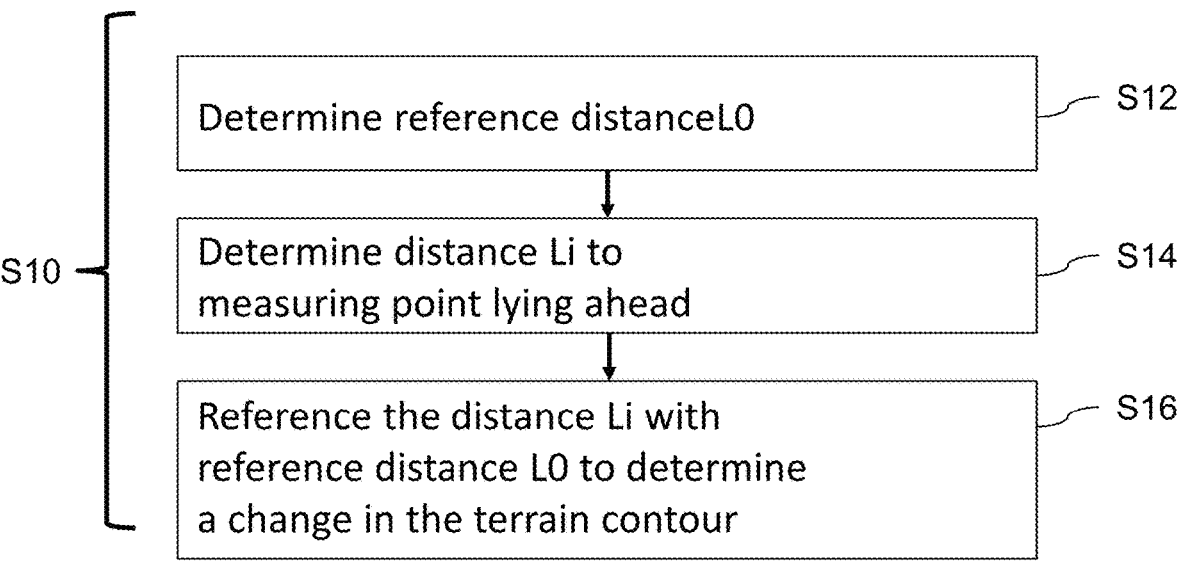
FIG. 4A shows a block diagram for illustrating a method according to one embodiment.
Figure 5A:
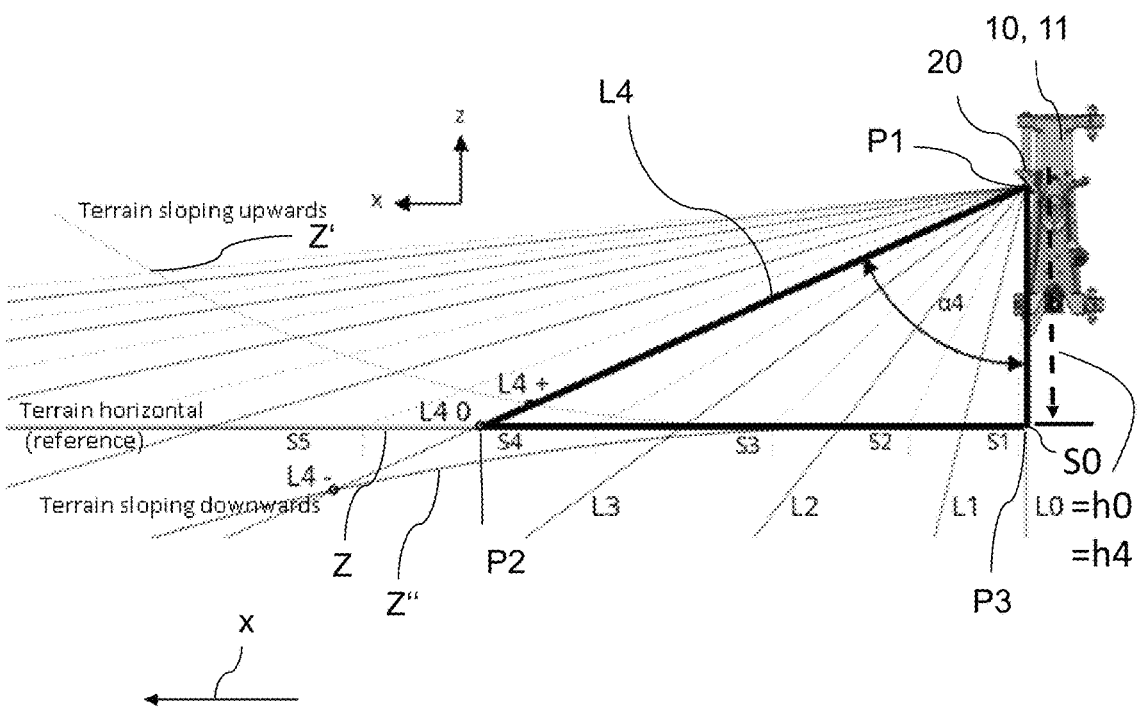
FIGS. 5A and 5B show schematic illustrations of a comparison of the distance and reference distance for determining a change in the terrain contour according to one embodiment.
Figure 5B:
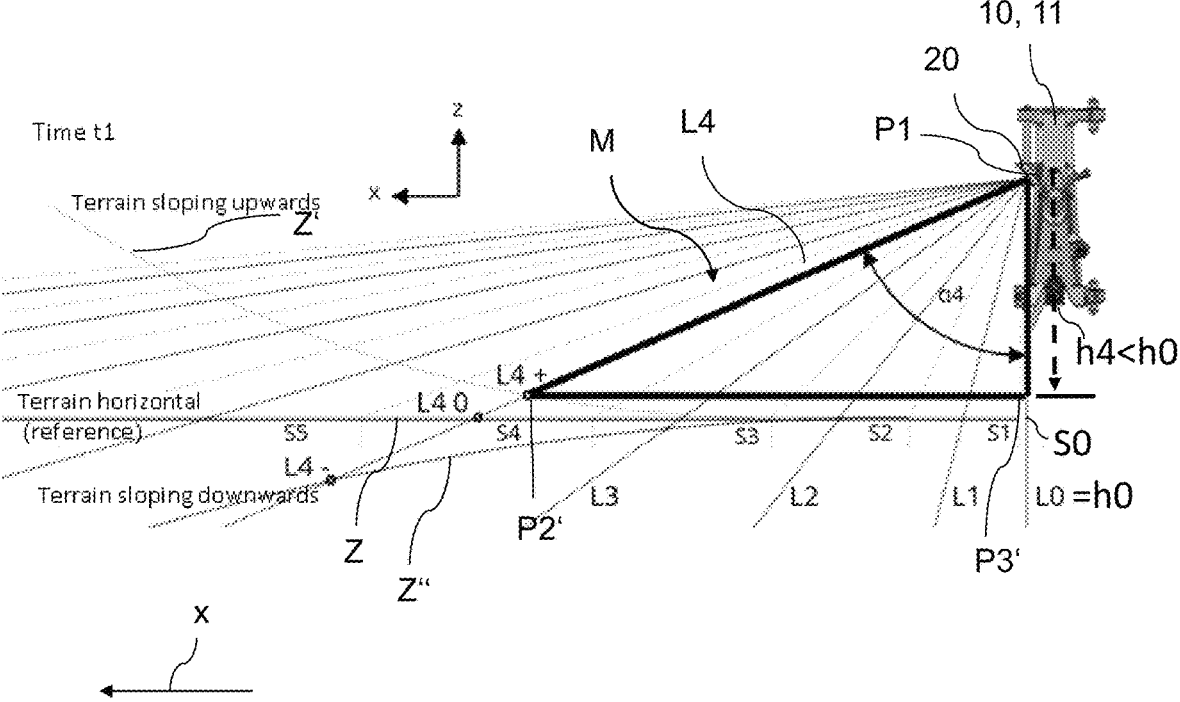

FIG. 4A shows a block diagram illustrating a method S10 for determining a terrain contour lying ahead in the direction of travel of an agricultural distribution machine 1 using measurement data from the sensor device 20. The control device 100 can be designed to perform the method S10 and to process the distance data received from the sensor device 20 accordingly for this purpose. Reference is also made to FIGS. 5A and 5B for an explanation of the method S10.

In step S12, a distance $L_0$ of the distribution boom from a reference measuring point S0 of a target area Z is determined. The distance $L_0$ is hereinafter referred to as the reference distance. As shown in FIG. 5A, a point on the target area Z directly below the sensor device can be selected as the reference measuring point S0, for example. The measured value $L_0$ of the sensor device 20, in this case the radar sensor, thus corresponds to the vertical distance $h_0$ of the sensor device 20 from the target area directly below the sensor device or the distribution boom 10. Since the mounting height of the sensor device 20 relative to the lower edge of the distribution boom is known, the distance between the lower edge of the distribution boom and the target area Z can also be calculated.

Furthermore, a distance of the distribution boom 10 and/or the sensor device 20 from at least one (further) measuring point of the target area Z, which is arranged ahead of the reference measuring point in the direction of travel of the distribution machine, is also determined (step S14). The measuring points S1 to S8 can be considered here as measuring points. The radar sensor provides measurement values (distances) for all measuring points S1 to S8 at each sampling time. The distance $L_4$ to measuring point S4 is selected as an example. The reference distance $L_0$ of the distribution boom and/or the sensor device 20 from the reference measuring point S0 and the (further) distance $L_4$ of the distribution boom and/or the sensor device 20 from the preceding measuring point S4 are determined simultaneously by the radar sensor.

The distance L4 corresponds to the distance of the sensor device 20 to the measuring point S4. In FIG. 5A, this corresponds to the length of the line connecting the points P1 and P2 or L4_0—if the target area Z between the reference measuring point S0 and the measuring point S4 does not have a gradient. This case is illustrated in FIG. 5A. FIG. 5A also illustrates a situation in which the terrain would be ascending. The corresponding target area is labelled with the reference sign Z'. In this case, the sensor device 20 would measure a shorter distance to the measuring point S4. The shorter distance would correspond to the length from point P1 to point L4+. FIG. 5A also illustrates a situation in which the terrain would be downwardly sloping. The corresponding target area is labelled with the reference sign Z". In this case, the sensor device 20 would measure a longer distance to the measuring point S4. The longer distance would correspond to the length from point P1 to point L4–.

FIG. 5B now shows the case in which the target area Z' between the reference measuring point S0 and the measuring point S4 has a gradient. Accordingly, the radar beam is already reflected at point P2' or L4+. The sensor device measures a shorter distance L4 accordingly.

To determine a change in the terrain contour at the measuring point, e.g. the measuring point S4, relative to the reference measuring point S0, the determined distance L4 is referenced with the determined reference distance L0 (step S16). Here, the determined distance variables (the reference distance L0 and the distance L4) are compared and/or set in relation to each other in such a way that a change in the vertical distance of the distribution boom to the target area at the reference measuring point can be calculated from the comparison compared to the measuring point.

For example, referencing can involve comparing a vertical component h4 of the distance L4 with a vertical component h0 of the reference distance L0. As the reference distance L0 is already measured as a vertical distance, it only has a vertical component (L0=h0). The comparison can include a subtraction or forming of a difference of the two vertical components.

It is possible that during the field work of the distribution machine 1 (for example continuously) height and/or position adjustments of the distribution boom 10 are carried out, expediently by means of the adjusting device 30 (e.g. to adjust to crops of different heights and/or to adjust to the contour of the terrain or the like), which results, for example, in the reference distance L0 being able to change (preferably accordingly).

The determination S12 can thus comprise and/or be based on a determination of a reference distance L0 that is substantially constant (e.g. at least in sections) and/or of a reference distance L0 that changes (e.g. at least in sections). The referencing S16 can, for example, comprise a substantially constant reference distance L0 (e.g. at least in sections) and/or can be based on a substantially constant reference distance L0 (e.g. at least in sections).

Alternatively or additionally, referencing S16 can, for example, comprise and/or be based on a reference distance L0 that changes (e.g. at least in sections) and thus can comprise or be based on (e.g. different and/or changing) reference distances L0.

The changing reference distance L0, preferably the changing reference distances L0, can be generated, for example, by, in particular, controlled height and/or position adjustments of the distribution boom 10, in particular in order to achieve a substantially constant distance of the distribution boom 10 to the target area, for example to the ground or crop surface.

It is possible that referencing S16 is carried out, for example, depending on this and thus preferably comprises a check as to whether the reference distance L0 changes (preferably at least in sections) and/or remains substantially constant (preferably at least in sections). Based on this, it is preferably possible to determine whether and, if so, how the distance Li and/or the terrain contour changes.

In the situation of a horizontal gradient shown in FIG. 5A, h4=h0, so that it can be deduced from this that the height profile of the terrain at measuring point S4 does not change compared to measuring point S0. For example, the terrain is horizontal.

In the situation of a terrain with a slope shown in FIG. 5B, it is apparent that h4<h0, so that it can be deduced from this that the height profile of the terrain at measuring point S4 has changed compared to measuring point S0, namely in such a way that the height distance of the distribution boom to the terrain has decreased by the amount (h0-h4) at measuring point S4.

The difference in the vertical components results in the change in the vertical distance of the distribution boom to the target area at the reference measuring point compared to the measuring point.

Since the angle α between the measuring direction of the distance and the measuring direction of the reference distance, i.e. the angle α4 at measuring point S4, is known and constant, the vertical component h4 can be calculated directly from the value L4 with the angle α4, e.g. $h4=\cos(\alpha4)*L4$, i.e. using a suitable trigonometric formula.

The distance vector and the reference distance vector are geometrically related, e.g. in a trigonometric or triangular relationship, via the angle α between them, here e.g. the angle α4. Referencing the determined distance with the determined reference distance to determine a change in the terrain contour at the measuring point relative to the reference measuring point can therefore be carried out based on this geometric relationship. In other words, the measuring point, the reference measuring point and a sensor point at which a sensor device for detecting the reference distance and the distance is arranged on the distribution machine, preferably on the distributing rod, can form corners of a geometric figure M, preferably a triangle. The corresponding triangle is shown in FIGS. 5A and 5B by the bold lines. The referencing process involves comparing and/or relating the distance to the reference distance on the basis of the geometric shape, preferably the triangle. This also applies if, for example, the reference distance is not measured as a vertical distance, but also forms an angle to the vertical. For example, the distance L1 could also be used as the reference distance. Changes in height detected on the basis of the measured values can be calculated quickly in this way.

Preferably, the aforementioned steps (determining the reference distance, determining the distance and referencing the determined distances to each other) are carried out continuously, e.g. continuously or at regular intervals, while the distribution machine is travelling, for example at a sampling rate in the range of from 1 to 50 Hz. Advantageously, the terrain contour lying ahead can be determined as accurately as possible during driving operation.

With the method shown in FIG. 4A, changes in the terrain contour can thus be determined precisely and in advance, so that it is possible to react to them at an early stage (in good time) as part of the height control of the distribution boom.

Figure 4B:
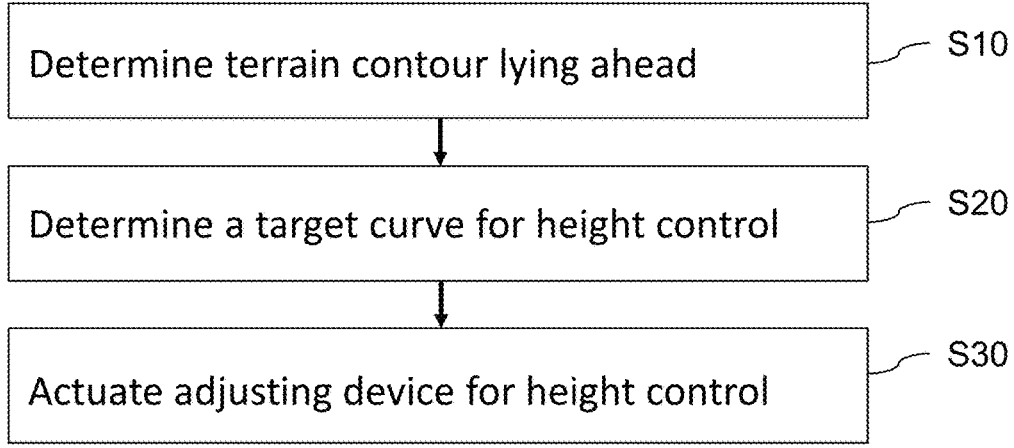
FIG. 4B shows a block diagram for illustrating a method according to a further embodiment.

FIG. 4B shows such a method for controlling the height of a distribution boom of the agricultural distribution machine. The control device 100 can be designed to carry out the method for height control and, for this purpose, to process the distance data received from the sensor device 20 accordingly and to output corresponding control signals for actuating the control device 30.

In step S10, the method initially comprises determining a terrain contour lying ahead in the direction of travel of the distribution machine. This can be carried out, for example, in accordance with steps S12, S14 and S16. The method for height control further comprises, in step S20, determining, depending on the determined terrain contour, a target curve for the height control of the distribution boom. The terrain contour can describe a height profile of the target area lying ahead. If, for example, the distribution boom is to maintain a certain target distance from the target area, the target curve can be defined depending on the determined terrain contour in such a way that the target curve substantially follows the terrain contour while maintaining the target distance. The target curve can therefore be offset by the target distance in the vertical direction compared to the determined terrain contour.

In step S30, an adjusting device 30 of the distributor boom 10 is then actuated to control the height of the distributor boom in accordance with the determined target curve. For this purpose, corresponding adjusting signals can be generated and output to actuate the adjusting device 30.

Figure 6:
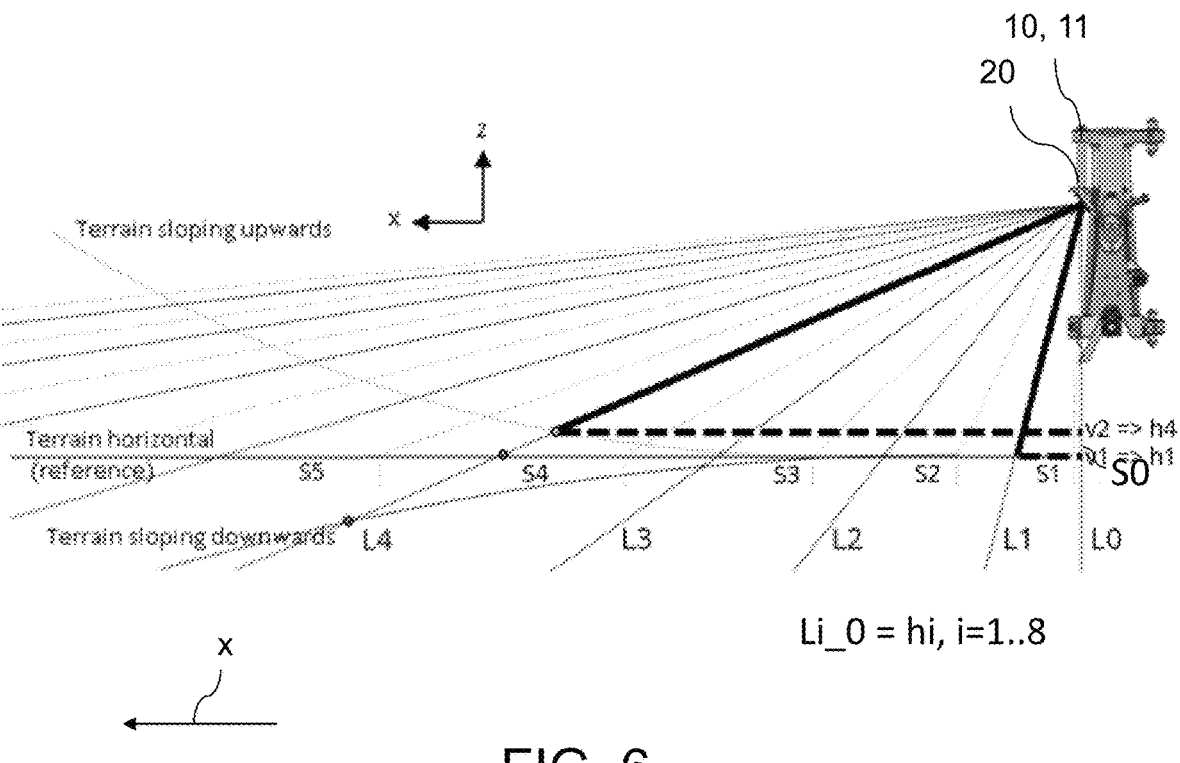
FIG. 6 shows a schematic illustration of a speed-dependent selection of the measuring point according to one embodiment.

FIG. 6 shows a schematic illustration of a speed-dependent selection of the measuring point according to a further embodiment.

It has already been established above that the sensor device 20 outputs distance values for all measuring points S1 to S8 at each measuring time in accordance with the sampling rate, one (or at least one) of which distance values is selected for referencing with the reference distance L0. For example, a distance can be selected from the multiple distances depending on a current speed. The current speed can be, for example, a current travel speed of the distribution machine.

For example, the distance can be selected depending on the current speed in such a way that the higher the current speed, the further away from the reference measuring point the measuring point of the selected distance is or is selected. The advantage of this is that at high current speed, a measuring point lying further ahead in the direction of travel is selected, which allows more time to adjust the height of the distribution boom to the change in the terrain contour detected at the measuring point in view of the high speed. If the current speed is lower, a closer measuring point can be selected, as a lower speed enables a longer reaction time for the height control, as it takes longer for the distributor machine to reach a recognized change in the terrain contour lying ahead. At the same time, the closer the measuring point in front is, the more accurately the change in the terrain contour ahead can be recognized.

This is shown as an example in FIG. 6. At a low speed v1, for example, the first measuring point S1 and the distance L1 can be used. The terrain contour can be determined particularly accurately at measuring point S1 because the distance value L1 provides very accurate measured values. However, there is little time to adjust the height of the distribution boom as part of the height control if a change in the terrain contour is determined using the distance value L1. Due to the (low) speed v1 of the distributor machine, there is sufficient time to adjust the height position before the measuring point S1 is reached, even taking into account the required system reaction time.

However, at a high travel speed v2, v2>v1, a measuring point lying further ahead is selected, in this example only the measuring point S4 and the distance value L4, in order to determine contour changes ahead. The terrain contour can be determined somewhat less accurately at measuring point S4 than at measuring point S1. However, the greater distance of measuring point S4 enables the height of the distribution boom to be adjusted earlier, preferably before reaching measuring point S4, even at the higher travel speed v2, if a change in the terrain contour is determined using the distance value L4.

For example, the measuring point and/or the distance can be selected depending on the current speed in such a way that $s \geq v*t$, where s corresponds to a distance in the direction of travel of the measuring point of the selected distance from the distribution boom (thus the horizontal distance when travelling in the plane), v corresponds to the current speed, e.g. the travel speed of the distribution machine, and t corresponds to a reaction time of the distribution machine for height adjustment. This ensures that, taking into account the required reaction time of the distributor machine for height adjustment, there is sufficient time to adjust the distributor boom to a new target height, which has been determined depending on the specific change in the terrain contour lying ahead.

Figure 7:
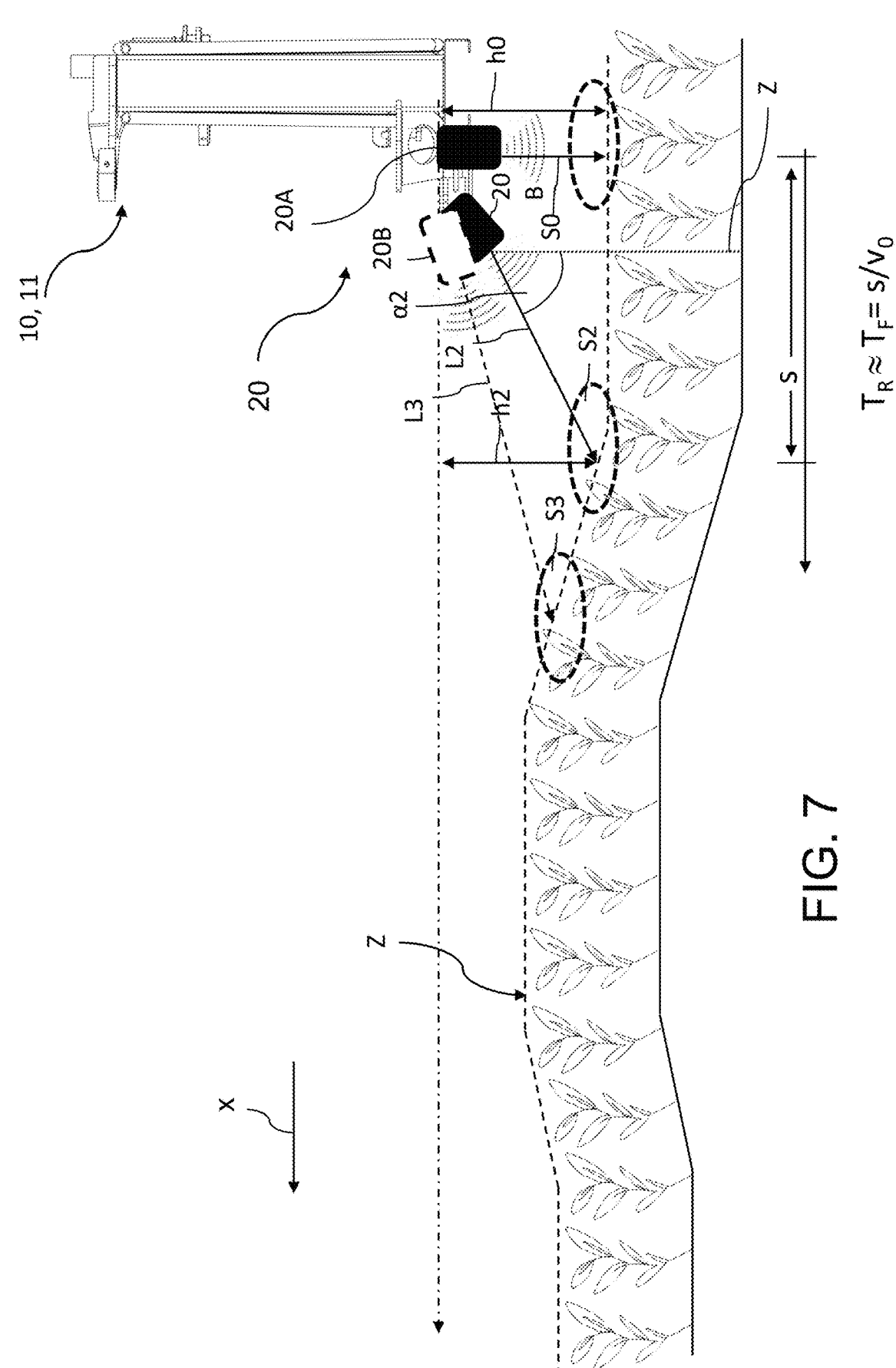
FIG. 7 shows a schematic illustration of a method and a distribution device according to a further embodiment.

FIG. 7 shows a schematic illustration of a method and a distribution device according to a further embodiment. It is understood that the techniques and features described with reference to FIG. 7 can be combined with the techniques and features described with reference to the previous figures, individually or in any combination.

The special feature of the exemplary embodiment illustrated in FIG. 7 is that the sensor device 20 detects the terrain contour at measuring points lying ahead in the direction of travel by means of a first sensor 20A, e.g. a long-range sensor, and the reference distance by means of a second sensor 20B, e.g. a short-range sensor. The short-range sensor 20B can be an ultrasonic sensor. The first sensor (long-range sensor) 20A is preferably a radar sensor. To determine a change in the terrain contour at the measuring point (Si) relative to the reference measuring point S0, the distance determined by the first sensor 20A is referenced with the reference distance determined by means of the second sensor 20B, e.g. by comparing the vertical component of the distance with the vertical component of the reference distance.

The first sensor (long-range sensor) can optionally scan several measuring points S2 or S3 lying ahead (or even more, as described, for example, in FIGS. 2A to 3B). If the first sensor (long-range sensor) is an ultrasonic sensor, it can be swivelled for this purpose, as shown in FIG. 7.

The measuring point lying ahead is preferably selected so that the travel time $T_F$ at the current travel speed v0 to the measuring point lying ahead substantially corresponds to the reaction time $T_R$, i.e. $T_R \approx T_F = s/v_0$, so that the adjustment of the boom position to the changed terrain contour is completed when the measuring point is reached.

As has already been established above, the methods for determining a terrain contour lying ahead in the direction of travel of an agricultural distribution machine 1 and for controlling the height of the distribution boom 10 of the distribution machine 1 can be carried out by the control device 100. The control device 100 receives sensor data from the sensor device 20, uses this to determine a terrain contour lying ahead in the direction of travel of the distribution machine 1, e.g. in accordance with steps S12, S13 and S16, and performs a height control of the distribution boom, e.g. in accordance with steps S10, S20 and S30.

The disclosure is not limited to the preferred exemplary embodiments described above. Rather, a large number of variants and modifications are possible which also make use of the inventive concept and therefore fall within the scope of protection. All range specifications herein are to be understood as being disclosed in such a way that, as it were, all values falling within the respective range are disclosed individually, e.g. also as respectively preferred narrower outer limits of the respective range.

LIST OF REFERENCE SIGNS

1 agricultural distribution machine
2 carrier vehicle
10 distribution boom
11 extension arm
12 centre part
20 sensor device, e.g. radar sensor
21 vertical effective range (sensor)
22 horizontal effective range (sensor)
30 adjusting device
32 adjusting cylinder
100 control device
S0 reference measuring point
S1 . . . . S8 measuring points, e.g. sectors of the sensor field of view
L1 . . . . L8 distance (mean value) for each sector S1-S8, distance vector
h4 comparison distance
α4 angle (mean value)
L0 reference distance
h0 height of the sensor device above ground
x direction of travel
P1 position of sensor device on distribution boom
P2, P3 measuring points
M geometric figure
Z, Z', Z" target area, e.g. ground or crop surface
S10-S30 method steps

What is claimed is:

1. A method for determining a terrain contour lying ahead in a direction of travel of an agricultural distribution machine, wherein the agricultural distribution machine has a distribution boom for spreading material, the method comprising:

determining a reference distance of the distribution boom from a reference measuring point of a target area;

determining a distance of the distribution boom from a measuring point of the target area arranged ahead of the reference measuring point in the direction of travel of the agricultural distribution machine, wherein determining the distance and the reference distance comprises receiving sensor data from a sensor device for detecting a terrain contour lying ahead, wherein the sensor device is arranged on the agricultural distribution machine; and referencing to determine a change in the terrain contour at the measuring point relative to the reference measuring point.

2. The method according to claim 1, wherein the referencing comprises:

determining a comparison distance from the determined distance and from an angle between different measurement directions of the distance and the reference distance, and comparing the comparison distance with the reference distance; and/or comparing a vertical component of the distance with a vertical component of the reference distance.

3. The method according to claim 1, wherein the measuring point, the reference measuring point, and a sensor point, at which a sensor device for detecting the reference distance and the distance is arranged on the agricultural distribution machine, form corners of a geometric figure, and wherein the referencing comprises comparing and/or relating the distance to the reference distance based on the geometric figure.

4. The method according to claim 3, wherein the sensor device for detecting the reference distance and the distance is arranged the distribution boom.

5. The method according to claim 3, wherein the geometric figure is a triangle.

6. The method according to claim 1, wherein the determined change in the terrain contour comprises a determined gradient of the terrain contour and/or a determined course of the terrain contour lying ahead.

7. The method according to claim 1, wherein the sensor device for detecting the terrain contour lying ahead has a field of view divided into a plurality of measuring points which are spaced at different distances from the distribution boom in the direction of travel of the agricultural distribution machine, wherein the sensor device is configured to determine a distance of the distribution boom from the target area for each measuring point, and wherein at least one of the distances is used for referencing with the determined reference distance.

8. The method according to claim 7, further comprising:

selecting a distance from a plurality of distances depending on a current speed and using the distance for referencing with the determined reference distance.

9. The method according to claim 8, wherein the distance is selected depending on the current speed so that the higher the current speed, the further away the measuring point of the selected distance is from the reference measuring point; and/or so that $$s \geq v*t,$$

wherein s corresponds to a distance in the direction of travel of the measuring point of the selected distance from the distribution boom, v corresponds to the current speed and t corresponds to a reaction time of the agricultural distribution machine for height adjustment.

10. The method according to claim 8, wherein the current speed is a current travel speed of the distribution machine or a current moving speed of the sensor device.

11. The method according to claim 1, wherein the distance and the reference distance are detected by the same sensor, or wherein the distance is detected by a long-range sensor and the reference distance is detected by a short-range sensor.

12. The method according to claim 11, wherein the long-range sensor is a radar sensor.

13. The method according to claim 11, wherein the short-range sensor is an ultrasonic sensor.

14. The method according to claim 1, further comprising:

determining a longitudinal inclination of the agricultural distribution machine relative to a traveling surface and/or relative to a horizontal, and using the longitudinal inclination a correction variable when determining the reference distance and/or the distance of the distribution boom.

15. The method according to claim 14, wherein the longitudinal inclination of the agricultural distribution machine is detected by an inclination sensor and/or determined by a vertical or substantially vertical distance measurement to the target area in front of a front axle or drawbar of the agricultural distribution machine and by a further vertical or substantially vertical distance measurement to the target area behind the front axle or behind the drawbar of the agricultural distribution machine; and/or wherein the longitudinal inclination is used to determine uphill or downhill travel and/or to determine longitudinal inclinations generated by uneven ground.

16. A method for controlling a height of a distribution boom of an agricultural distribution machine, the method comprising:

determining a terrain contour lying ahead in a direction of travel of the agricultural distribution machine according to the method of claim 1;

determining, depending on the determined terrain contour, a target curve for the height control of the distribution boom; and actuating an adjusting device of the distribution boom for height control of the distribution boom in accordance with the determined target curve.

17. The method according to claim 16, wherein the determined target curve is used for a primary height control of the distribution boom and the reference distance is then used for secondary height control as subsequent or fine control.

18. The method according to claim 16, wherein time points for actuating the adjusting device of the distribution boom for height control of the distribution boom according to the determined target curve are defined so that a reaction time of the adjusting device during height control is at least partially compensated.

19. The method according to claim 16, wherein the reference distance is a substantially constant reference distance, wherein the reference distance is a reference distance that changes, wherein the referencing comprises a substantially constant reference distance, wherein the referencing is based on a substantially constant reference distance, wherein the referencing comprises a reference distance that changes, and/or wherein the referencing is based on a reference distance that changes.

20. The method according to claim 16, wherein the agricultural distribution machine is a field sprayer or a pneumatic fertilizer spreader.

21. The method according to claim 16, wherein the determined target curve is used for an initial, height control of the distribution boom and the reference distance is then used for secondary height control as subsequent or fine control.

22. The method according to claim 16, wherein time points for actuating the adjusting device of the distribution boom for height control of the distribution boom according to the determined target curve are defined depending on a travel speed of the distribution machine so that a reaction time of the adjusting device during height control is at least partially compensated.

23. A control device for controlling a height of a distribution boom of an agricultural distribution machine, wherein the control device is configured to perform the method according to claim 1.

24. An agricultural distribution machine, comprising:

a distribution boom for spreading a material, the distribution boom comprising a center part and two lateral extension arms, each of which has a plurality of spreading elements for spreading the material;

an actuatable adjusting device for changing a position of the distribution boom relative to an agricultural target area to be processed;

a sensor that detects the reference distance and the distance to the target area; and the control device according to claim 23.

25. The agricultural distribution machine according to claim 24, wherein the material for spreading is at least one material selected from the group consisting of: fertilizer, pesticide, and seed.

26. The method according to claim 1, wherein the agricultural distribution machine is a field sprayer or a pneumatic fertilizer spreader.

27. The method according to claim 1, wherein the referencing is by comparing and/or relating the determined distance to the determined reference distance.

28. The method according to claim 1, wherein the sensor device is arranged on the distribution boom.

29. The method according to claim 1, wherein the sensor device comprises a radar sensor.

* * * * *